(12) United States Patent
Choudhary et al.

(10) Patent No.: US 12,737,029 B2
(45) Date of Patent: Sep. 15, 2026

(54) PROCESSORS HAVING CORE CONTROL CIRCUITS TO CONTROL CORE TRANSITIONS BETWEEN LOW POWER MODES AND RELATED METHODS

(71) Applicant: QUALCOMM Incorporated, San Diego, CA (US)

(72) Inventors: Dinesh Kumar Choudhary, Tonk (IN); Srinivas Rao Lengamaneni, Hyderabad (IN); Maulik Shah, Hyderabad (IN); Nirav Narendra Desai, Hyderabad (IN); Chandan Agarwalla, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 18/607,859

(22) Filed: Mar. 18, 2024

(65) Prior Publication Data

US 2025/0291403 A1 Sep. 18, 2025

(51) Int. Cl.
*G06F 1/32* (2019.01)
*G06F 1/3237* (2019.01)

(52) U.S. Cl.
CPC .................................. *G06F 1/3237* (2013.01)

(58) Field of Classification Search
CPC .................................... G06F 1/12; G06F 1/32
See application file for complete search history.

(56) References Cited

U.S. PATENT DOCUMENTS

2008/0183904 A1* 7/2008 Kim ........................ G06F 9/445 710/6
2010/0058078 A1* 3/2010 Branover ................ G06F 1/329 713/300
2011/0078478 A1* 3/2011 Branover .............. G06F 1/3203 713/323
2012/0072750 A1* 3/2012 Jahagirdar .......... G06F 11/1441 713/322
2013/0305013 A1* 11/2013 Ebersole ............. G06F 9/30189 712/32
2013/0305068 A1* 11/2013 Jung ..................... G06F 1/3206 713/320
2013/0318384 A1* 11/2013 Yoshihara ............. G06F 1/3203 713/323
2014/0089697 A1* 3/2014 Kim ...................... G06F 1/3296 713/320

(Continued)

*Primary Examiner* — Phil K Nguyen
(74) *Attorney, Agent, or Firm* — W&T

(57) ABSTRACT

A core circuit in a processor executes instructions in an operating mode and, when the core circuit is idle, transitions to a low-power mode to reduce power consumption. Low power modes include a clock-gated mode, in which a clock signal is blocked, and a power-collapse mode, in which a supply voltage is shut off. An exemplary core control circuit may transition the core circuit from the operating mode to the clock-gated mode to reduce power consumption and then transition the core circuit from the clock-gated mode to the power-collapse mode to further reduce power consumption. The core control circuit is also configured to transition the core circuit back to the operating mode. The core control circuit may transition the core circuit to the power-collapse mode in response to a signal from a timer circuit and transitions the core circuit back to the operating mode in response to an interrupt signal.

21 Claims, 6 Drawing Sheets

(56) References Cited

U.S. PATENT DOCUMENTS

| | | | | |
|---|---|---|---|---|
| 2014/0095896 | A1* | 4/2014 | Carter | G06F 1/26<br>713/300 |
| 2016/0179176 | A1* | 6/2016 | Kohara | G06F 1/3243<br>713/322 |
| 2016/0314024 | A1* | 10/2016 | Chang | G06F 1/3287 |
| 2016/0321183 | A1* | 11/2016 | Govindan | G06F 1/3296 |
| 2017/0192492 | A1* | 7/2017 | Li | G06F 1/3206 |
| 2018/0164873 | A1* | 6/2018 | Gendler | G06F 1/3296 |
| 2019/0205042 | A1* | 7/2019 | Kandula | G06F 3/0619 |
| 2019/0369707 | A1* | 12/2019 | Iwamoto | G06F 1/3287 |
| 2021/0311540 | A1* | 10/2021 | Wong | G06F 1/3275 |
| 2024/0069809 | A1* | 2/2024 | Betz | G06F 1/3225 |

* cited by examiner

PROCESSORS HAVING CORE CONTROL CIRCUITS TO CONTROL CORE TRANSITIONS BETWEEN LOW POWER MODES AND RELATED METHODS

BACKGROUND

I. Field of the Disclosure

The technology of the disclosure relates generally to power reduction in digital circuits in integrated circuits and, more particularly, to providing resilience to timing changes while reducing power consumption.

II. Background

Processing circuits (processors) such as central processing units (CPUs) and graphics processing units (GPUs) are ubiquitous in electronic devices. Processors are able to meet the high-performance data processing requirements of such devices by employing multiple processor core circuits (cores) that operate simultaneously, where each core may be capable of executing multiple instruction streams (e.g., in a time-shared manner). During periods of high performance, all cores in a processor may be constantly busy executing instructions, while consuming power at a high rate. Cores include transistor circuits that operate with a high clock frequency, consuming power as the transistors are turned on and off and/or change the states of their output nodes in every cycle of the clock signal. When processing requirements are lower, one or more of the cores may not be needed and may enter an idle state. The amount of power consumed by a core in an idle state may depend on the technology of the transistor circuits and on the implementation of low-power modes in the processor. For example, to avoid any performance delay returning from an idle state to a busy state (e.g., executing application instructions) a core may simply execute no-operation (no-op) instructions while awaiting the next application instruction. However, power consumption of the core will remain high as long as the transistor circuits are switching, even if they are merely executing no-op instructions.

For this reason, core designers have developed low-power modes into which the core circuit can be transitioned to reduce a rate of power consumption when the core circuit is expected to be idle for some period of time. The low-power mode chosen for power savings in a given instance may depend on how long the core is expected to be idle. A first low-power mode, referred to herein as a clock-gated mode, is achieved by blocking (e.g., stopping, gating, or disabling) the clock signal that is provided to the core circuit to stop circuit switching. In particular, the clock signal is provided to sequential logic circuits causing them to switch, so blocking the clock signal stops progression of signals through the sequential logic circuits, suspending the states of state machines. In this manner, by stopping the clock signal, the rate of power consumption is reduced significantly. However, because a supply voltage is still provided to the transistor circuits of the core circuit, and such circuits may suffer from leakage currents, significant power may still be wasted in the clock-gated mode. Another low-power mode, referred to herein as power-collapse mode, is an alternative to the clock-gated mode and is achieved by shutting off the power (e.g., supply voltage) to at least a significant portion of the transistor circuits in a core, to stop the leakage currents and further reduce power loss compared to the clock-gated mode.

However, when the supply voltage is turned off for the power-collapse mode, the states of circuits of the core circuit may be lost and need to be re-initialized before returning to the operating mode. Therefore, before turning off the supply voltage, operating mode information of the core circuit may be saved and then restored when provision of the supply voltage is resumed. Thus, while the clock-gated mode may be less beneficial than the power-collapse mode from the perspective of power savings, the latencies of entering and exiting the clock-gated mode are much less than that of the power-collapse mode. In situations in which a core is expected to idle for a limited or uncertain period of time, even though the power savings of the power-collapse mode may be more desirable, the entry/exit latency may make the power-collapse mode infeasible. As a result, the clock-gated mode is employed during the idle time, causing a higher than desirable rate of overall power consumption in the processor compared to the power-collapse mode.

SUMMARY

Aspects disclosed in the detailed description include processors having core control circuits to control transitions between low power modes. Related methods of controlling transitions of cores to a power saving mode are also disclosed. A core circuit in a processor is configured to execute instructions in an operating mode and, when the core circuit is idle, the processor may transition the core circuit to a low-power mode to reduce power consumption. Low power modes include a clock-gated mode, in which a clock signal to the core circuit is blocked, and a power-collapse mode, in which a supply voltage to the core circuit is shut off. In an exemplary processor, a core control circuit is configured to transition the core circuit from the operating mode to the clock-gated mode to reduce power consumption and then transition the core circuit from the clock-gated mode to the power-collapse mode to further reduce power consumption. The core control circuit is also configured to transition the core circuit back to the operating mode. In some examples, the core control circuit transitions the core circuit to the power-collapse mode in response to a signal from a timer circuit and transitions the core circuit back to the operating mode in response to an interrupt signal.

In this regard, in one exemplary aspect, a processor is provided. The processor includes a first core circuit configured to execute instructions in an operating mode and a first core control circuit. The first core control circuit is configured to control the first core circuit to transition from the operating mode to a clock-gated mode in which a clock signal to the first core circuit is blocked, transition from the clock-gated mode to a power-collapse mode in which a supply voltage to the first core circuit is shut off, and transition to the operating mode from the power-collapse mode.

In another exemplary aspect, an integrated circuit (IC) including a processor is provided. The IC includes a clock generation circuit configured to generate a clock signal, a voltage control circuit configured to provide a supply voltage, a plurality of core circuits including a first core circuit configured to execute instructions in an operating mode, and a plurality of core control circuits. The plurality of core control circuits includes a first core control circuit configured to control the first core circuit to transition from the operating mode to a clock-gated mode in which the clock signal is blocked in the first core circuit, transition from the clock-gated mode to a power-collapse mode in which the supply voltage is switched off in the first core circuit, and transition to the operating mode from the power-collapse mode.

In another exemplary aspect, a method in a processor to reduce power consumption is provided. The method includes controlling a first core circuit configured to execute instructions in an operating mode to transition from the operating mode to a clock-gated mode in which a clock signal is blocked in the first core circuit, transition from the clock-gated mode to a power-collapse mode in which a supply voltage is switched off in the first core circuit, and transition to the operating mode from the power-collapse mode.

DETAILED DESCRIPTION

Figure 1:
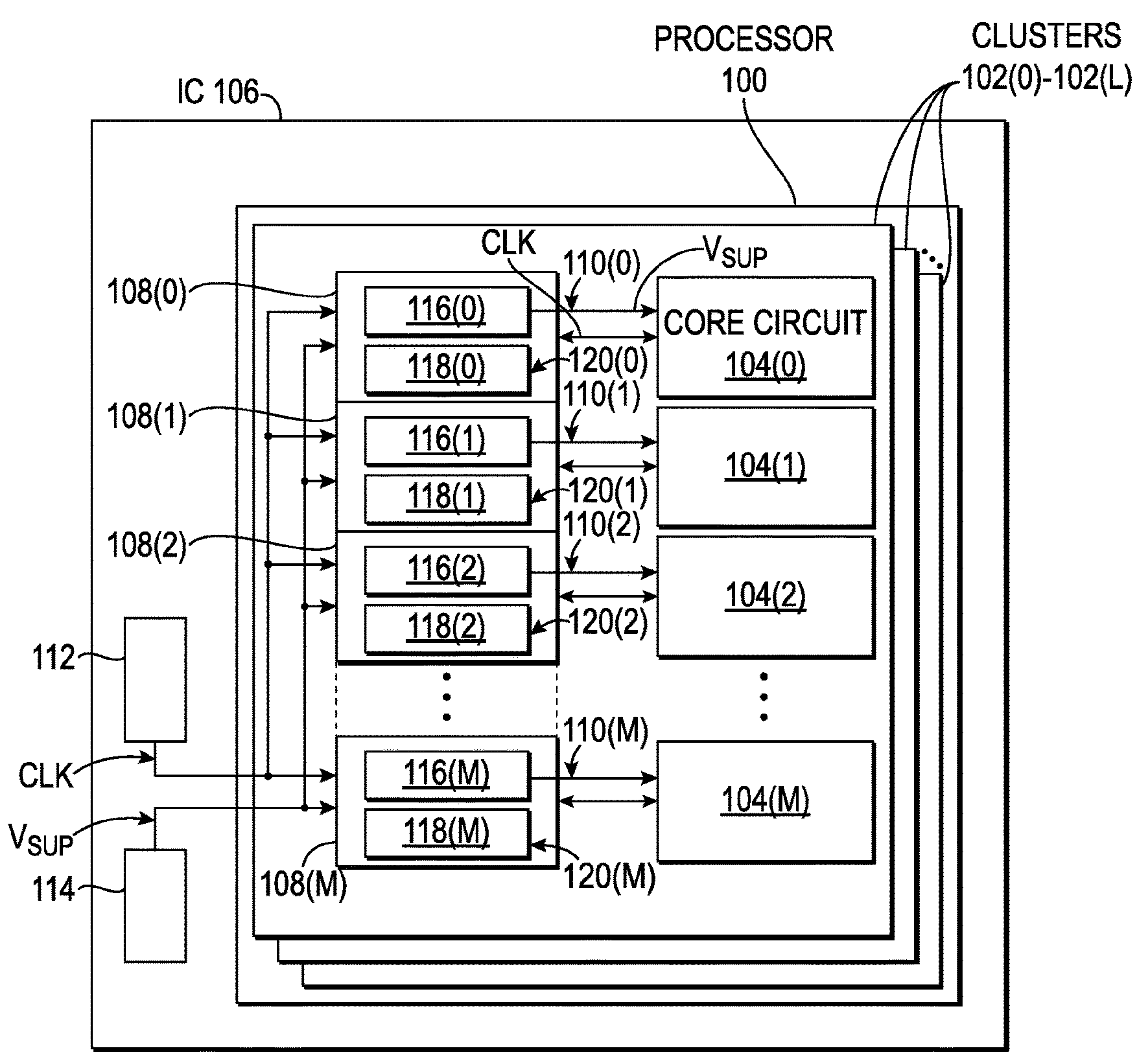
FIG. 1 is a schematic diagram of a processor including clusters of core circuits on an integrated circuit (IC) and including core control circuits for controlling each of the core circuits to transition from a clock-gated mode to a power-collapse mode to further reduce power consumption.

Several exemplary aspects of the present disclosure are described in reference to the drawing figures. The word "exemplary" is used herein to mean "serving as an example, instance, or illustration." Any aspect described herein as "exemplary" is not necessarily to be construed as preferred or advantageous over other aspects.

Aspects disclosed in the detailed description include processors having core control circuits to control transitions between low power modes. Related methods of controlling transitions of cores to a power saving mode are also disclosed. A core circuit in a processor is configured to execute instructions in an operating mode and, when the core circuit is idle, the processor may transition the core circuit to a low-power mode to reduce power consumption. Low power modes include a clock-gated mode, in which a clock signal to the core circuit is blocked, and a power-collapse mode, in which a supply voltage to the core circuit is shut off. In an exemplary processor, a core control circuit is configured to transition the core circuit from the operating mode to the clock-gated mode to reduce power consumption and then transition the core circuit from the clock-gated mode to the power-collapse mode to further reduce power consumption. The core control circuit is also configured to transition the core circuit back to the operating mode. In some examples, the core control circuit transitions the core circuit to the power-collapse mode in response to a signal from a timer circuit and transitions the core circuit back to the operating mode in response to an interrupt signal.

FIG. 1 is a schematic diagram of a processor circuit ("processor") 100 including clusters 102(0)-102(L) of core circuits 104(0)-104(M) (where "L" and "M" are positive integer numbers) on an integrated circuit (IC) 106, and also including core control circuits 108(0)-108(M) in each of the clusters 102(0)-102(L) for controlling the core circuits 104(0)-104(M) to transition to and from low-power modes, and specifically from a clock-gated mode to a power-collapse mode. The core circuits 104(0)-104(M) may be any core circuit (e.g., central processing unit (CPU), graphics processing unit (GPU), arithmetic unit, or accelerator) capable of executing instructions in a processor. Multiple core circuits 104(0)-104(M) are provided in the processor 100 to execute instructions in parallel to achieve high level performance requirements of many applications and devices. In normal operation, as well as in periods of light or irregular use, there may be periods in which the processing demands of the processor 100 decrease, such that fewer than all of the core circuits 104(0)-104(M) are employed for instruction execution and one or more may become inactive. In some cases, the durations of such periods of reduced activity may be reliably estimated so, to avoid the unnecessary consumption of power during such periods, a core circuit may be transitioned to one of the low-power modes.

In an example that may represent any of the core circuits 104(0)-104(M) as controlled by the corresponding core control circuits 108(0)-108(M), the core circuit 104(0) in the cluster 102(0) is described with reference to FIG. 1. The core circuit 104(0) includes transistor circuits (not shown) that include sequential circuits that are configured to change state in response to a rise or fall in the voltage of a clock signal CLK depending on inputs to the sequential circuits. Each time the transistor circuits in the core circuit 104(0) change state, circuit nodes are charged and discharged, and power is consumed. To reduce the consumption of power during an idle period of the core circuit 104(0) (e.g., when no instructions are being executed or a loop of no-operation (no-op) instructions is being executed), the core control circuit 108(0) may transition the core circuit 104(0) to a clock-gated mode, which involves blocking the clock signal CLK provided to the core circuit 104(0) to prevent the sequential circuits from changing state and, thereby, reducing power consumption. The term "blocked" with reference to the clock signal CLK provided to the core circuit 104(0) refers to the clock signal CLK being gated, disabled, deactivated and/or otherwise prevented from causing the sequential logic circuits in the core circuit 104(0) from operating during the clock-gated mode.

Since the core circuit 104(0) is not operating in the clock-gated mode, but the core circuit 104(0) will need to be restored to the operating mode at some point, the core control circuit 108(0) remains active (e.g., continues to receive the active clock signal CLK) so that the core control circuit 108(0) can continue to operate and can cause the core circuit 104(0) to transition back to the operating mode when there are instructions to be executed. During the clock-gated mode, a signal 110(0) is generated in an interrupt logic circuit 116(0) in the core control circuit 108(0) to indicate that the core circuit 104(0) needs to be returned to the operating mode, and the core control circuit 108(0) transitions the core circuit 104(0) back to the operating mode, which may include removing the "blocking" or gating of the clock signal CLK, thereby allowing the clock signal CLK to be provided to the (transistor circuits of the) core circuit 104(0). The signal 110(0) causing the transition out of the clock-gated mode may be generated in response to an interrupt or exception from another one of the core circuits 104(1)-104(M), from another one of the clusters 102(1)-102(L), or from a circuit external to the processor 100 and received in the interrupt logic circuit 116(0), for example. In some examples, a hypervisor instruction executed in another one of the core circuits 104(1)-104(M) may be used to generate an interrupt to cause the interrupt logic circuit 116(0) to reactivate the core circuit 104(0) (transition out of clock-gated mode) based on performance requirements.

The clock signal CLK is generated by a clock generator 112, which may be a phase-locked loop (PLL) or a digital PLL (DPLL), for example, and a voltage supply 114 provides a supply voltage $V_{SUP}$ that powers the core circuit 104(0). The core control circuit 108(0) may block the clock signal CLK to the core circuit 104(0) in the clock-gated mode and may shut off the supply voltage $V_{SUP}$ provided to the core circuit 104(0) in the power-collapse mode. The voltage supply 114 continues to provide a supply voltage $V_{SUP}$ to the core circuit 104(0) during the clock-gated mode. Accordingly, the states of the transistor circuits therein may be preserved (e.g., suspended) during the clock-gated mode. When the clock signal CLK is no longer blocked (e.g., is reactivated), normal operation may resume without a loss of data. In this regard, transitioning the core circuit 104(0) into and out of the clock-gated mode may be achieved quickly and, therefore, may be employed when short periods of idle time or inactivity of the core circuit 104(0) are expected.

While the clock-gated mode does provide a reduction in power consumption, a shortcoming of the clock-gated mode is that power continues to be consumed due to leakage currents, for example, even when the clock signal CLK is blocked and the transistor circuits are not switching. In this regard, the core control circuit 108(0) may alternatively transition the core circuit 104(0) to a power-collapse mode to further reduce power consumption during periods of inactivity (e.g., idle periods). The power-collapse mode is entered in response to the supply voltage $V_{SUP}$ to the core circuit 104(0) being shut off (e.g., disconnected, disabled, etc.). In the power-collapse mode, the transistor circuits are no longer operational and electrical circuits may be discharged. Thus, a state of the core circuit 104(0) is not preserved during the power-collapse mode. For this reason, the state information that will be needed to restore the core circuit 104(0) back to normal operation is saved before entering the power-collapse mode.

As in the clock-gated mode, the core control circuit 108(0) remains active and may restore power (e.g., the supply voltage $V_{SUP}$) to the core circuit 104(0) in response to the signal 110(0) (e.g., interrupt signal or exception signal) that is generated in the interrupt logic circuit 116(0) in the core control circuit 108(0). Interrupt logic circuits 116(1)-116(M) are included in the core control circuits 108(1)-108(M) to generate signals 110(1)-110(M). The state information saved before entering the power-collapse mode may be retrieved and used to restore the state of the core circuit 104(0) when it is transitioned back to the operating mode (i.e., when the supply voltage $V_{SUP}$ is again provided to the core circuit 104(0), in addition to the clock signal CLK).

The core control circuits 108(0)-108(M) also include timer circuits 118(0)-118(M) that generate signals 120(0)-120(M). Referring again to the core circuit 104(0), as an example, the signal 120(0) may be generated by the timer circuit 118(0) upon expiration (e.g., due to incrementing or decrementing) of a value set in the timer circuit 118(0). As explained in more detail below, in an exemplary aspect, the signal 120(0) generated in the timer circuit 118(0) causes the core control circuit 108(0) to transition the core circuit 104(0) from the clock-gated mode to (e.g., directly to) the power-collapse mode to reduce power consumption.

Additional features of the exemplary processor 100 in FIG. 1 are described below with reference to the flow diagram in FIG. 2 that illustrates transitions of the exemplary core circuit 104(0) into and out of low-power modes. First, the flow diagram 200 illustrating transitions of a conventional core circuit, from an operating mode to one of a clock-gated mode and a power-collapse mode and back to the operating mode in response to an interrupt signal, is described with reference to FIG. 2. The conventional core circuit described with reference to FIG. 2 may include core circuits arranged the same as or similar to the processor 100 in FIG. 1 but does not have the exemplary features of the processor in FIG. 1, such as transitioning from the clock-gated mode to the power-collapse mode.

The flow diagram 200 includes a software-controlled flow 201S indicating actions involving and in response to executing instructions in the core circuit 104(0) or other core circuits 104(1)-104(M). The flow diagram 200 also includes a hardware-controlled flow 201H prompted by signals provided to and generated in circuits (e.g., state machines implemented in sequential logic circuits) in the core control circuit 108(0) and the core circuit 104(0). In the flow diagram 200, operation of a conventional core circuit begins at a boot state 202 that occurs after power on or system reset. In the boot state 202, instructions for initializing the processor may be executed in each of the core circuits of a processor. Following the boot state 202, the core circuit proceeds to an operating mode 204 in which an operating system manages processes, applications, and/or any software to be executed by the core circuit. As noted above, one or more core circuits in a multi-core processor occasionally enters an idle state 206 in which there are no tasks to be performed. In the idle state, the operating system may predict how long the core circuit will be idle and may determine that power consumption could be reduced if the core circuit transitions to a low-power mode.

The time required for transitioning into and out of (also referred to herein as entry into and exit out of) the clock-gated mode may be as little as a few cycles of the clock signal CLK. In contrast, however, saving and restoring state information of the core circuit for transitioning into the power-collapse mode, and then restoring the state of the core circuit when transitioning back to the operating mode may take many more cycles of the clock signal CLK. Accordingly, employing the power-collapse mode as a low-power mode when the core circuit is going to be idle may be reserved for occasions in which the expected idle time is long enough to make the transition worthwhile despite the longer entry and exit times.

The core circuit enters a decision state 208 in which a decision is made regarding which low-power mode should be entered. In some examples, the decision may be based on the predicted idle time being at least a threshold amount, below which the clock-gated mode is entered and above which the power-collapse mode is entered. Entry into the clock-gated mode may include states 210 and 212 in which the operating system and hypervisor software, respectively, execute instructions to transition the core circuit to the clock-gated mode. The operating system state 212 may cause a signal 214 to be provided to a core control circuit to transition the core circuit to the clock-gated mode 216. For example, the core control circuit may gate the clock signal CLK in response to the signal 214. The core circuit may remain in the clock-gated mode 216 until the core circuit is moved to an exit state 218 (e.g., the clock signal CLK is no longer blocked) by a signal 220 indicating an interrupt or exception that is generated or received in the core control circuit. The transition from the clock-gated mode back to the operating mode 204 includes states 222 and 224 in the hypervisor and operating system kernel, respectively. In each of the states 222 and 224, the operating system and/or kernel may execute one or more instructions in the core circuit.

Flow diagram 200 also includes states of the conventional circuit in transitions to and from a power-collapse mode 226. At the decision state 208, when the operating system predicts an idle time of more than the threshold amount, the core circuit proceeds to states 228 and 230 in which the operating system and hypervisor, respectively, may save state information of the core circuit and may make decisions and/or take actions based on cluster level consideration to prepare for putting the core circuit in the power-collapse mode 226. In state 232, the firmware may take final steps to transition the hardware of the core circuit to the power-collapse mode 226. For example, the firmware may cause a signal 234 to be generated to a core control circuit to shut off the supply voltage $V_{SUP}$ to the core circuit for entry into the power-collapse mode 226. Subsequently, the core control circuit receives the signal 220, which may be due to an interrupt or exception in another core circuit, indicating a need to return to the operating mode 204 and, in response to a signal from the core control circuit, the core circuit enters an exit state 236. The transition back to the operating mode 204 includes state 238 in which firmware prepares the hardware to return to the operating mode 204, followed by states 240 and 242 in which the hypervisor and operating system may take further steps to restore the core circuit to the operating mode 204.

Figure 3:
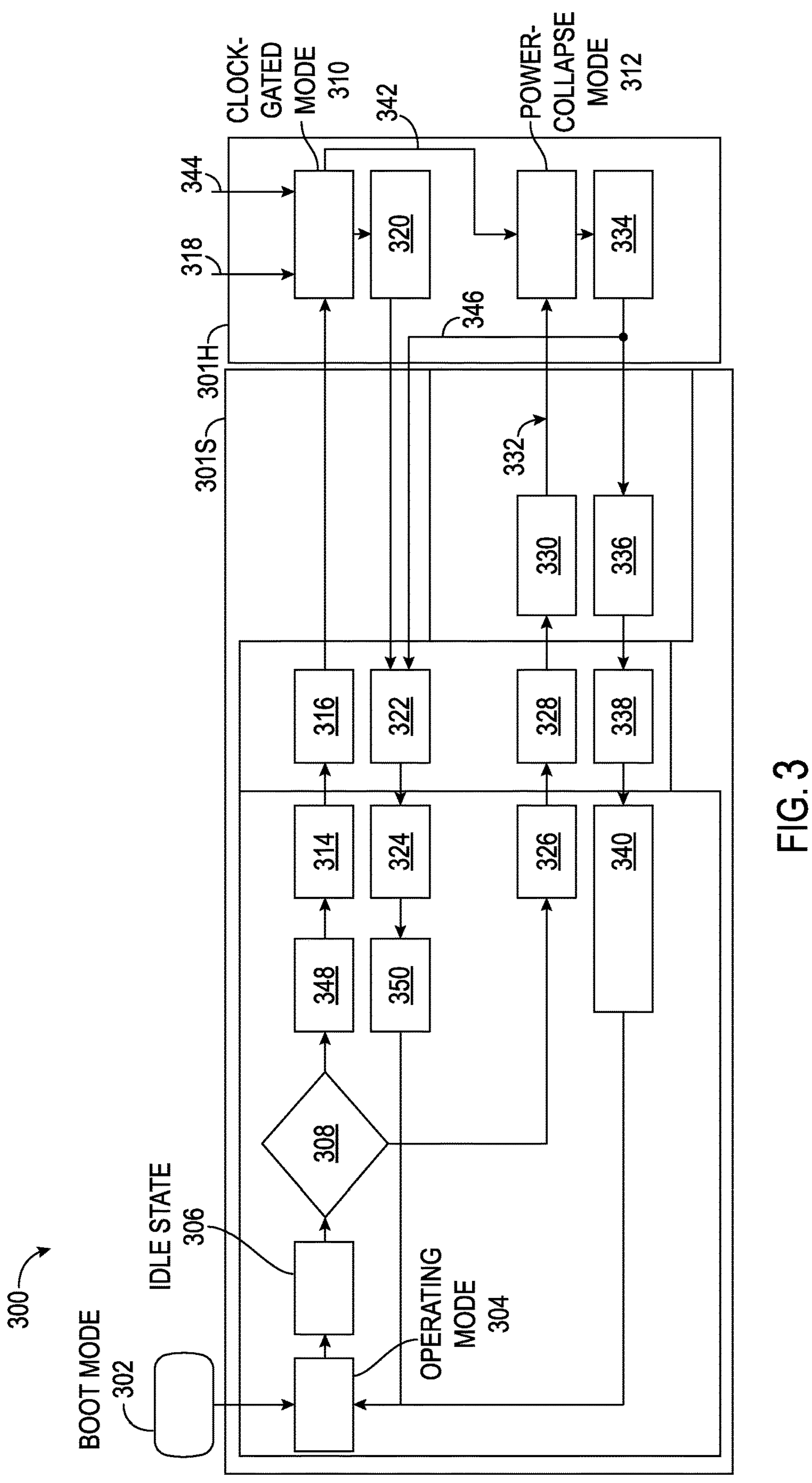
FIG. 3 is a flow diagram of exemplary transitions, depending on expected idle time of an exemplary core circuit, from an operating mode to a clock-gated mode, from the clock-gated mode to the power-collapse mode in response to a signal of a timer circuit to further reduce power consumption, and back to the operating mode in response to an interrupt signal.

FIG. 3 is a flow diagram 300 illustrating transitions of the core circuit 104(0) in FIG. 1 between an operating mode and low-power modes including exemplary transitions from (e.g., directly from) a clock-gated mode to a power-collapse mode and back to an operating mode. The flow diagram 300 includes a software-controlled flow 301S and a hardware-controlled flow 301H. Following power on or system reset, the core circuit 104(0) enters a boot state 302 for initialization before entering an operating mode 304. The operating system manages execution of instructions that may be from various virtual machines handling user applications, processes, or system management. As discussed above, the core circuit 104(0) may experience periods in which there are no tasks to be performed and, as a result, the core circuit 104(0) enters an idle state 306. In the idle state 306, the core circuit 104(0) may execute no-operation (no-op) instructions or other types of instructions in a loop until returning back to the operating mode 304. In some cases, when the core circuit 104(0) enters the idle state 306, the operating system may be able to predict a period of time for which the core circuit 104(0) will or is likely to remain idle. In decision state 308, the operating system determines (e.g., based on instructions of the operating system) whether to enter a clock-gated mode 310 or a power-collapse mode 312. The operating system may compare the predicted idle time to a threshold, where the predicted idle time being less than the threshold causes the core circuit 104(0) to transition to the clock-gated mode 310 and the predicted idle time being more than the threshold causes the core circuit 104(0) to transition to the power-collapse mode 312.

Figure 2:
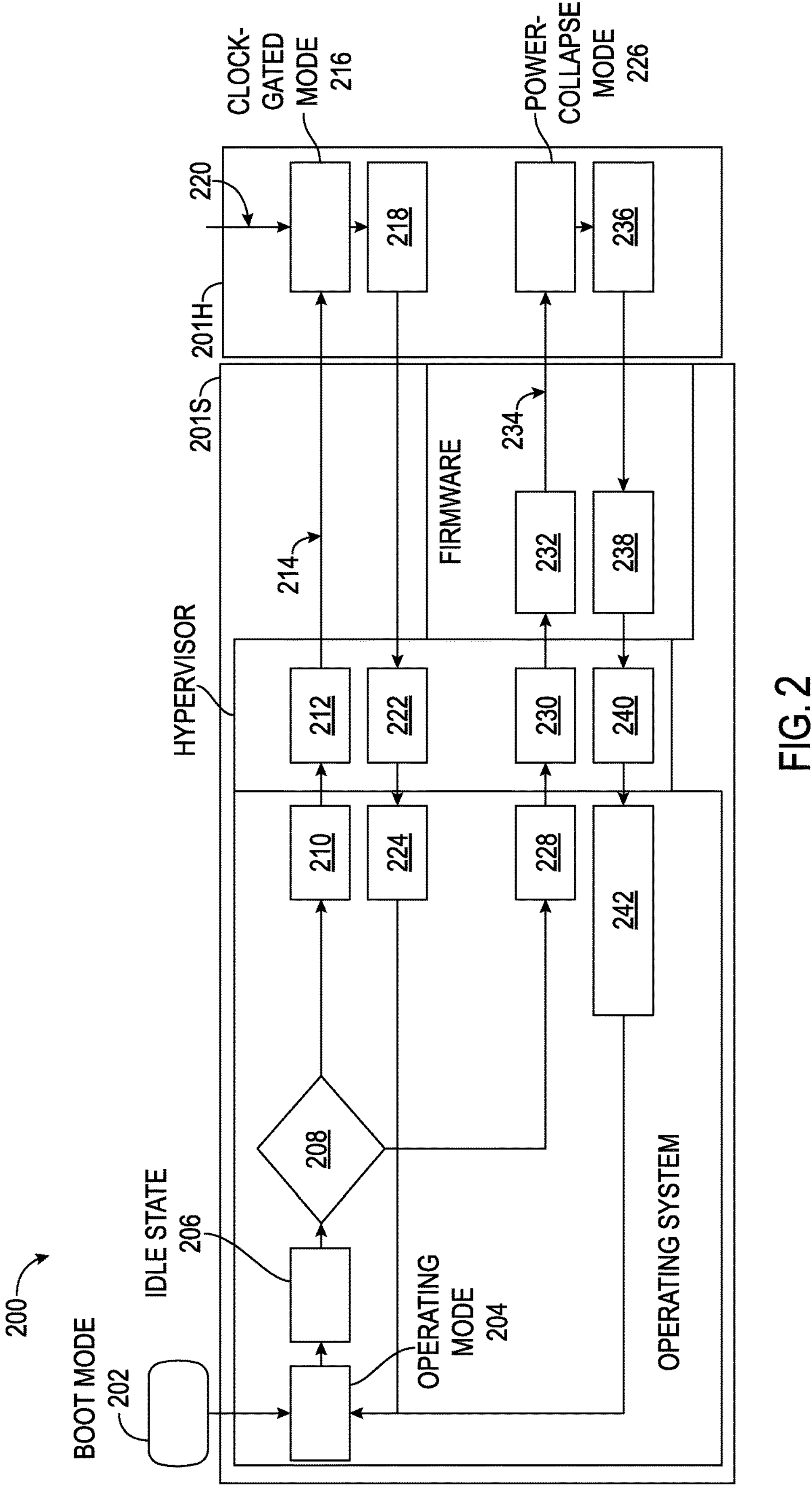
FIG. 2 is a flow diagram of transitions, depending on expected idle time of a conventional core circuit, from an operating mode to one of a clock-gated mode and a power-collapse mode to reduce power consumption, and back to the operating mode in response to an interrupt signal.

As discussed above with regard to operation of a conventional core circuit, as illustrated in FIG. 2, transitioning to the clock-gated mode 310 includes states 314 and 316 representing actions/instructions of the operating system and hypervisor, respectively. While in the clock-gated mode, receiving a signal 318, indicating an interrupt signal or exception condition to the core control circuit 108(0), causes a transition from the clock-gated mode 310 back to an exit state 320 involving actions performed in the hardware, followed by states 322 and 324 corresponding to actions/instructions of the hypervisor and operating system, respectively. The signal 318 may be the signal 110(0) generated by the interrupt logic circuit 116(0) in the core control circuit 108(0) in FIG. 1.

With regard to a transition to the power-collapse mode 312, flow diagram 300 includes transition states 326, 328, and 330 of the operating system, hypervisor, and firmware, respectively, which correspond to the states 228, 230, and 232 of flow diagram 200 in FIG. 2. The firmware state 330 prepares the hardware for shutting off the supply voltage $V_{SUP}$ and causes the generation of a signal 332 causing the core control circuit 108(0) to control the core circuit 104(0) to enter the power-collapse mode 312. As in the clock-gated mode 310, the transition from the power-collapse mode 312 back to the operating mode 304 is initiated in response to the signal 318 indicating an interrupt or exception condition. In response to the signal 318, the core circuit 104(0) enters an exit state 334 of the hardware, proceeds to a firmware state 336 to recover from the power-collapse mode 312, and then continues to states 338 and 340. The states 336, 338, and 340 may correspond to the states 238, 240, and 242 of the firmware, hypervisor, and operating system in FIG. 2.

In exemplary aspects, the flow diagram 300 shows additional features and states of the processor 100 that do not occur in the conventional flow illustrated in FIG. 2. In particular, in addition to receiving the signal 318 indicating an interrupt or exception to cause the core circuit 104(0) to exit the power-collapse mode 312 and transition back to the operating mode 304, the flow diagram 300 also shows a transition 342 that may be initiated by a signal 344 generated by the timer circuit 118(0) in the core control circuit 108(0). With reference back to FIG. 1, the core control circuits 108(0)-108(M) include timer circuits 118(0)-118(M) in which respective timer values may be set. In some examples, the timer circuits are binary values that increment or decrement every cycle of the clock signal CLK, such that the value set in the timer circuit 108(0), for example, corresponds to a number of cycles of the clock signal CLK and a period of time based on a period of the clock signal CLK. Upon expiration of the timer circuit 118(0), the signal 344 is generated and, in response to the signal 344, the core control circuit 108(0) causes the core circuit 104(0) to make the transition 342 from the clock-gated mode 310 to the power-collapse mode 312. The transition 342 may be referred to as transitioning directly from the clock-gated mode 310 to the power-collapse mode 312 because control of the core circuit 104(0) of the transition is implemented by hardware circuits (e.g., sequential circuits) without a return to the software flow (i.e., firmware, hypervisor, or operating system), which means that the core circuit 104(0) does not return to the operating mode 304 during the transition 342.

Operations of the core circuit 104(0) are representative of any of the core circuits 104(0)-104(M) which, in response to receiving the signal 344, may transition directly (e.g., without first returning to the operating mode 304) from the clock-gated mode 310 to the power-collapse mode 312. Transitions in the hardware-controlled flow 301H are not caused or controlled by the execution of instructions in the core circuit 104(0) but rather, in response to signals in the hardware circuits of the core control circuit 108(0). In response to the signal 344, the core control circuit 108(0) performs the steps needed to preserve the state of the core circuit 104(0) (e.g., from before entering the clock-gated mode 310) and the core circuit 104(0) can be transitioned from the clock-gated mode 310 to the power-collapse mode 312. This transition 342 may involve temporarily activating the clock signal CLK to save state information of the core circuit 104(0) before shutting off the supply voltage $V_{SUP}$. Subsequently, in response to the signal 318 indicating an interrupt, the core circuit 104(0) enters the exit state 334 and, having entered the power-collapse mode 312 by way of the transition 342 under hardware control, the core control circuit 108(0) causes the core circuit 104(0) to then make an exemplary transition 346 back to the operating mode 304 through the states 320 and 322 of the hypervisor and operating system, respectively, which are employed for transitioning back to the operating mode 304 from the clock-gated mode 310.

The software-controlled flow 301S also includes states to manage the timer circuits 118(0)-118(M). The timer circuit 118(0) may be set (e.g., and enabled) by the operating system to a time value in a timer set state 348 during the transition to the clock-gated mode, and upon returning to the operating mode 304 by way of the state 322, the operating system enters a timer clear state 350, in which the operating system may reset or clear and/or disable the timer circuit 118(0). The transition to the clock-gated mode 310 combined with the transition 342 to the power-collapse mode, and back to the operating mode 304 by way of the transition 346 may occur in less time (e.g., fewer cycles of the clock signal CLK) than the conventional steps for transitioning into and out of the power-collapse mode 312 from the operating mode 304. For example, in the decision state 308, if the predicted idle time is less than the threshold related to the time cost of entering and exiting the power-collapse mode 312 by the conventional (e.g., software controlled) method, it may not be beneficial to enter the power-collapse mode 312 by the conventional method. However, there may be a range of times, less than the threshold time, in which transitioning the core circuit 104(0) from the operating mode 304 to the clock-gated mode 310, to the power-collapse mode 312 by way of the transition 342, and back to the operating mode 304 by way of transition 346 provides a power consumption improvement over existing methods.

Further, the timer circuit 118(0), which generates the signal 344 to cause the transition 342, may be set to appropriate values to immediately initiate the transition 342, perform the transition 342 after a selected time depending on the signal 344, or avoid the transition 342. In some examples, the signal 318, indicating an interrupt, may be expected to occur either in a time shorter than a short period P1 or longer than a long period P2, respectively. Transitioning to the power-collapse mode 312 and back to the operating mode 304 may take longer than the short period P1, so the timer circuit 118(0) is set to a value slightly greater than the short period P1 before entering the clock-gated mode. If the signal 318 occurs in the short period P1, the core circuit 104(0) returns to the operating mode 304 from the clock-gated mode. However, if the signal 318 does not occur in the short period P1, the timer circuit 118(0) expires, generating the signal 344, and the core circuit 104(0) proceeds by way of the transition 342 to the power-collapse mode 312. The core circuit 104(0) remains in the power-collapse mode 312 until the signal 318 indicates the interrupt after the long period P2. In such examples, the long period P2 may correspond to a default wake-up signal generated by the core control circuit 108(0).

In some examples, the predicted idle time of the core circuit 104(0) may be small, such that a transition to the power-collapse mode 312 may not be preferred. In such examples, the timer circuit 118(0) may be disabled or set to a maximum value, which depends on a range of the timer circuit 118(0). Setting the timer circuit 118(0) to a maximum value essentially ensures that the transition 342 will not be taken if the signal 318 is received in the predicted idle time.

In some examples, when the signal 318 (e.g., interrupt) is expected to occur far in the future, the timer circuit 118(0) may be set to an expiration time corresponding to zero cycles of the clock signal CLK to immediately cause the signal 344 to be generated upon entering the clock-gated mode 310 and perform the transition 342 of the core circuit 104(0) to the power-collapse mode 312 to increase power savings. In some examples, transitioning to the power-collapse mode 312 by way of the transition 342 and returning back to the operating mode 304 by way of the transition 346 provides a greater reduction in power consumption for an individual core circuit 104(0) than the software-controlled transition to and from the power-collapse mode (e.g., by way of states 326, 328, 330, 336, 338, and 340).

Figure 4:
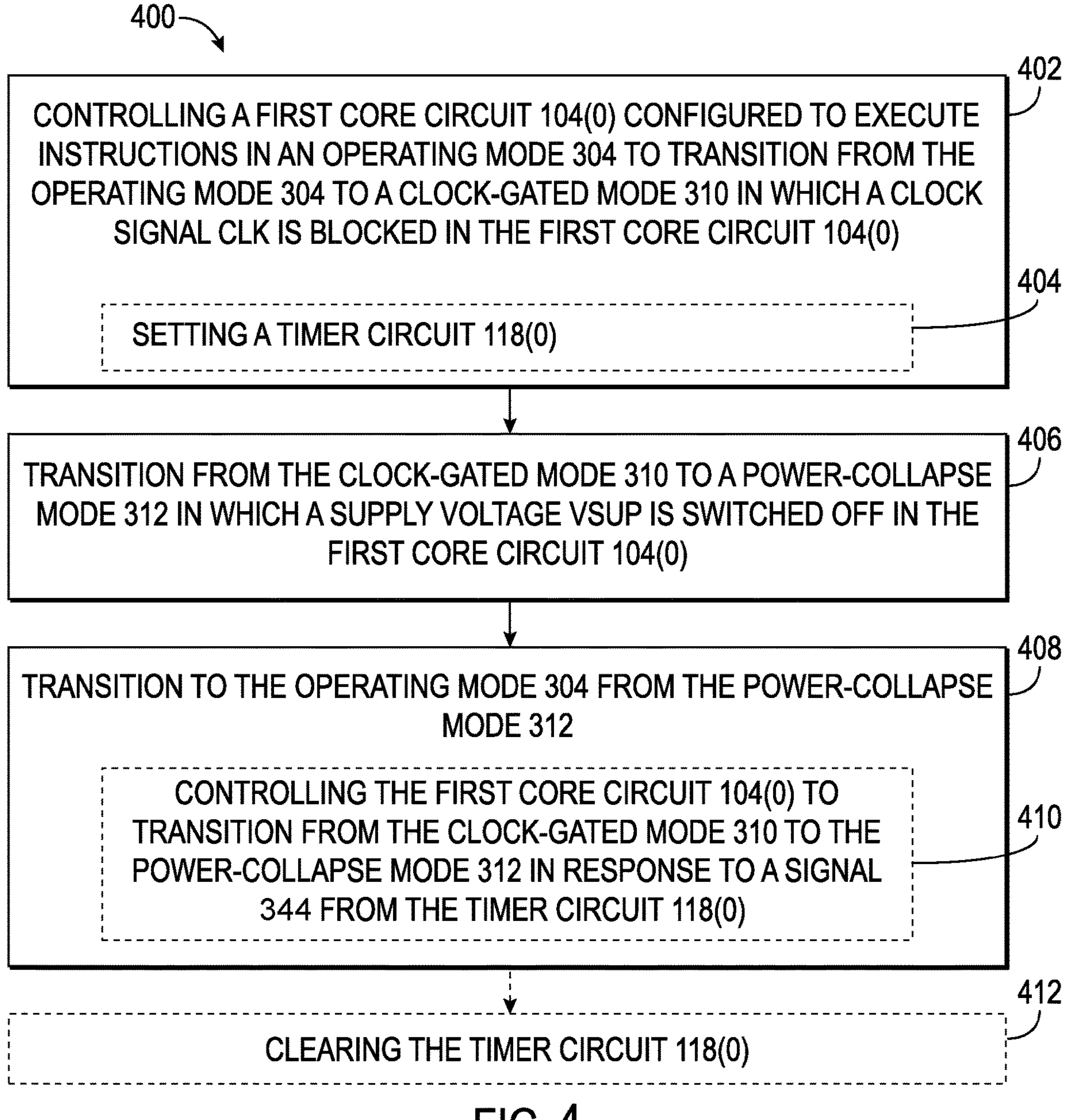
FIG. 4 is a flowchart of an exemplary process in the processor in FIG. 1 of transitioning from an operating mode to a clock-gated mode, from the clock-gated mode to the power-collapse mode to further reduce power consumption, and back to the operating mode.

FIG. 4 is a flow chart of an exemplary method 400 in a processor 100 to reduce power consumption. The method includes controlling a first core circuit 104(0) configured to execute instructions in an operating mode 304 to transition from the operating mode 304 to a clock-gated mode 310 in which a clock signal CLK is blocked in the first core circuit 104(0) (block 402), which may include setting a timer circuit 118(0) (block 404). The method also includes transitioning from the clock-gated mode 310 to a power-collapse mode 312 in which a supply voltage $V_{SUP}$ is switched off in the first core circuit 104(0) (block 406), and transitioning to the operating mode 304 from the power-collapse mode 312 (block 408), which may include controlling the core circuit 104(0) to transition the core circuit 104(0) from the clock-gated mode 310 to the power-collapse mode 312 in response to a signal 344 from the timer circuit 118(0) (block 410). In some examples, the method may further include clearing the timer circuit 118(0) (block 412).

Electronic devices, according to any aspects disclosed herein, may be provided in or integrated into any processor-based device. Examples, without limitation, include a set-top box, an entertainment unit, a navigation device, a communications device, a fixed location data unit, a mobile location data unit, a global positioning system (GPS) device, a mobile phone, a cellular phone, a smartphone, a session initiation protocol (SIP) phone, a tablet, a phablet, a server, a computer, a portable computer, a mobile computing device, laptop computer, a wearable computing device (e.g., a smartwatch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 5:
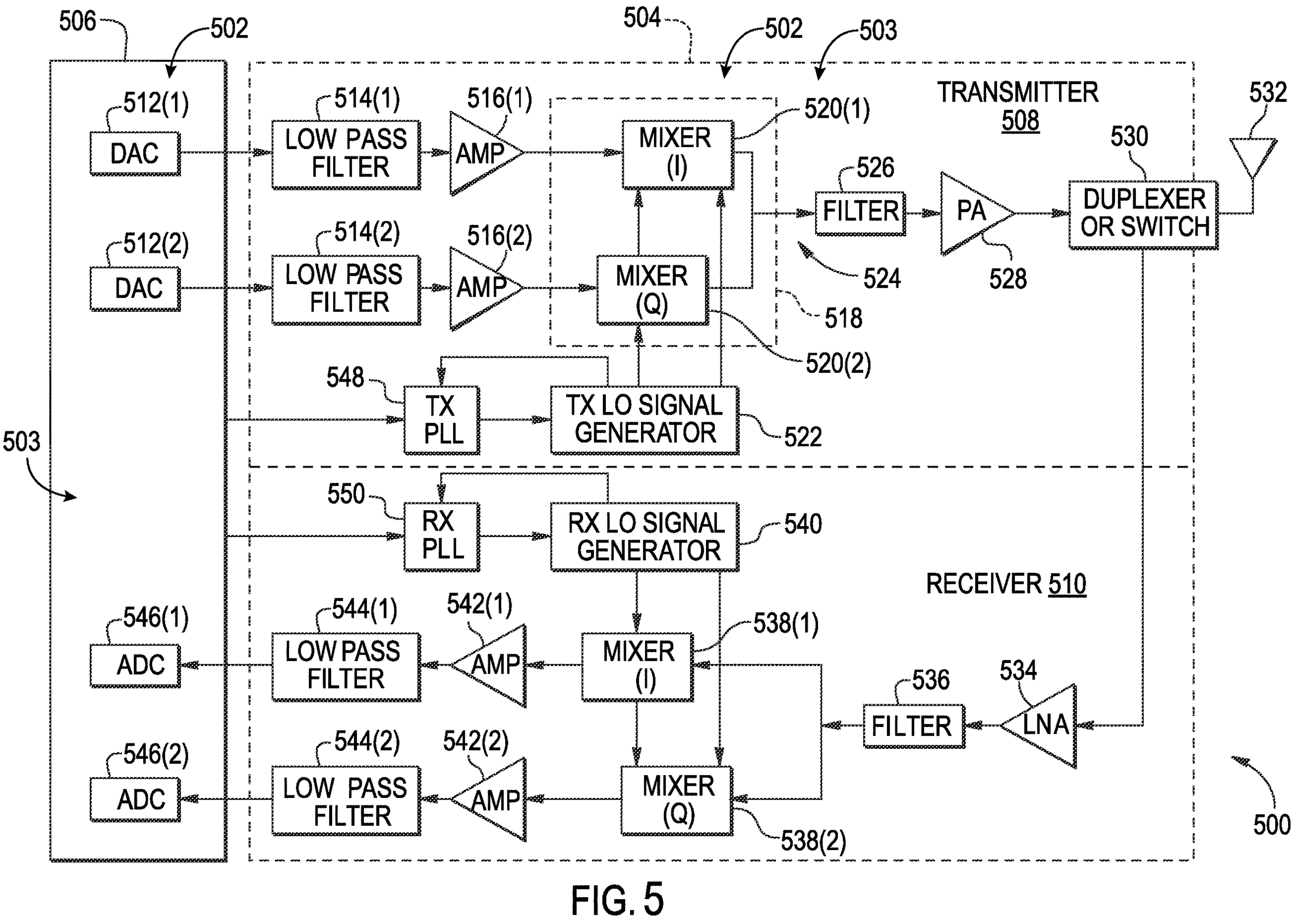
FIG. 5 is a block diagram of an exemplary processor-based system that can include the processor of FIG. 1 including clusters of core circuits on an integrated circuit (IC) and including core control circuits for controlling each of the core circuits to transition from a clock-gated mode to a power-collapse mode to reduce power consumption.

In this regard, FIG. 5 illustrates a block diagram of an exemplary wireless communications device 500 that includes radio frequency (RF) components formed from one or more ICs 502, wherein the communications device 500 may include the IC 106 in FIG. 1, in which the processor 100 includes core control circuits configured to transition core circuits from a clock-gated mode to a power-collapse mode to reduce power consumption. The wireless communications device 500 may include or be provided as examples in any of the above-referenced devices. As shown in FIG. 5, the wireless communications device 500 includes a transceiver 504 and a data processor 506. The data processor 506 may include a memory to store data and program codes. The transceiver 504 includes a transmitter 508 and a receiver 510, which support bi-directional communications. In general, the wireless communications device 500 may include any number of transmitters 508 and/or receivers 510 for any number of communication systems and frequency bands. All or a portion of the transceiver 504 may be implemented on one or more analog ICs, RF ICs (RFICs), mixed-signal ICs, etc.

The transmitter 508 or the receiver 510 may be implemented with a super-heterodyne or direct-conversion architecture. In the super-heterodyne architecture, a signal is frequency-converted between RF and baseband in multiple stages, e.g., from RF to an intermediate frequency (IF) in one stage and then from IF to baseband in another stage. In the direct-conversion architecture, a signal is frequency-converted between RF and baseband in one stage. The super-heterodyne and direct-conversion architectures may use different circuit blocks and/or have different requirements. In the wireless communications device 500 in FIG. 5, the transmitter 508 and the receiver 510 are implemented with the direct-conversion architecture.

In the transmit path, the data processor 506 processes data to be transmitted and provides I and Q analog output signals to the transmitter 508. In the exemplary wireless communications device 500, the data processor 506 includes digital-to-analog converters (DACs) 512(1), 512(2) for converting digital signals generated by the data processor 506 into I and Q analog output signals, e.g., I and Q output currents, for further processing.

Within the transmitter 508, lowpass filters 514(1), 514(2) filter the I and Q analog output signals, respectively, to remove undesired signals caused by the prior digital-to-analog conversion. Amplifiers (AMPs) 516(1), 516(2) amplify the signals from the lowpass filters 514(1), 514(2), respectively, and provide I and Q baseband signals. An upconverter 518 upconverts the I and Q baseband signals with I and Q transmit (TX) local oscillator (LO) signals from a TX LO signal generator 522 through mixers 520(1), 520(2) to provide an upconverted signal 524. A filter 526 filters the upconverted signal 524 to remove undesired signals caused by the frequency upconversion and noise in a receive frequency band. A power amplifier (PA) 528 amplifies the upconverted signal 524 from the filter 526 to obtain the desired output power level and provides a transmit RF signal. The transmit RF signal is routed through a duplexer or switch 530 and transmitted via an antenna 532.

In the receive path, the antenna 532 receives signals transmitted by base stations and provides a received RF signal, which is routed through the duplexer or switch 530 and provided to a low noise amplifier (LNA) 534. The duplexer or switch 530 is designed to operate with a specific receive (RX)-to-TX duplexer frequency separation, such that RX signals are isolated from TX signals. The received RF signal is amplified by the LNA 534 and filtered by a filter 536 to obtain a desired RF input signal. Downconversion mixers 538(1), 538(2) mix the output of the filter 536 with I and Q RX LO signals (i.e., LO_I and LO_Q) from an RX LO signal generator 540 to generate I and Q baseband signals. The I and Q baseband signals are amplified by AMPs 542(1), 542(2) and further filtered by lowpass filters 544(1), 544(2) to obtain I and Q analog input signals, which are provided to the data processor 506. In this example, the data processor 506 includes analog-to-digital converters (ADCs) 546(1), 546(2) for converting the analog input signals into digital signals to be further processed by the data processor 506.

In the wireless communications device 500 of FIG. 5, the TX LO signal generator 522 generates the I and Q TX LO signals used for frequency upconversion, while the RX LO signal generator 540 generates the I and Q RX LO signals used for frequency downconversion. Each LO signal is a periodic signal with a particular fundamental frequency. A TX phase-locked loop (PLL) circuit 548 receives timing information from the data processor 506 and generates a control signal used to adjust the frequency and/or phase of the TX LO signals from the TX LO signal generator 522. Similarly, an RX PLL circuit 550 receives timing information from the data processor 506 and generates a control signal used to adjust the frequency and/or phase of the RX LO signals from the RX LO signal generator 540.

Figure 6:
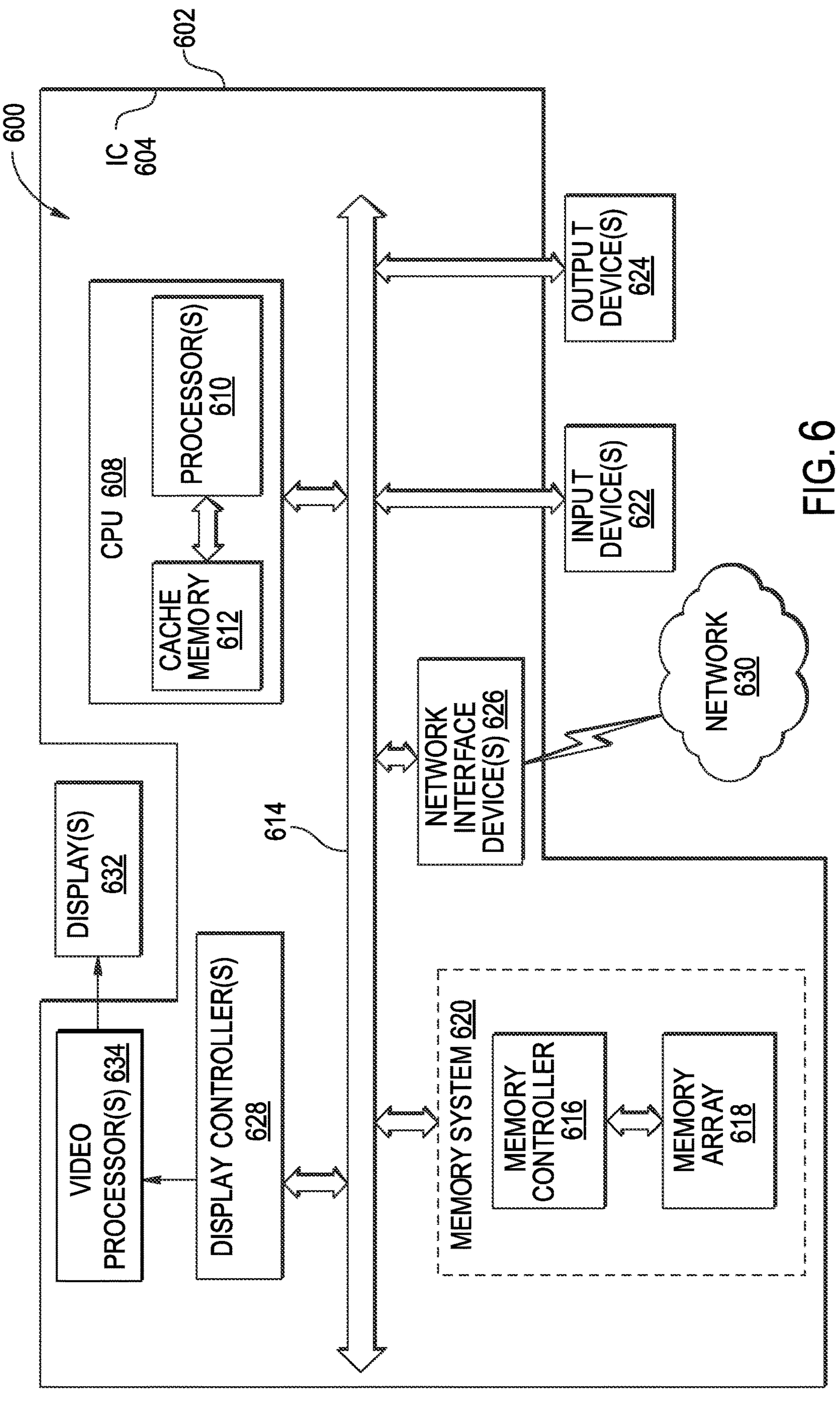
FIG. 6 is a block diagram of an exemplary wireless communication device that includes radio-frequency (RF) components that can include the processor of FIG. 1 including clusters of core circuits on an integrated circuit (IC) and including core control circuits for controlling each of the core circuits to transition from a clock-gated mode to a power-collapse mode to reduce power consumption.

FIG. 6 illustrates a block diagram of an example of a processor-based system 600 that may be implemented on the IC 106 in FIG. 1 in which a processor includes core control circuits configured to transition core circuits from a clock-gated mode to a power-collapse mode to reduce power consumption. In this example, the processor-based system 600 includes a processor 602 that includes an IC 604 including one or more central processor units (CPUs) 608, which may also be referred to as CPU or processor cores, each including one or more processors 610. The CPU(s) 608 may have cache memory 612 coupled to the processor(s) 602 for rapid access to temporarily stored data. The CPU(s) 608 is coupled to a system bus 614 and can intercouple master and slave devices included in the processor-based system 600. As is well known, the CPU(s) 608 communicates with these other devices by exchanging address, control, and data information over the system bus 614. For example, the CPU(s) 608 can communicate bus transaction requests to a memory controller 616 as an example of a slave device. Although not illustrated in FIG. 6, multiple system buses 614 could be provided wherein each system bus 614 constitutes a different fabric.

Other master and slave devices can be connected to the system bus 614. As illustrated in FIG. 6, these devices can include a memory system 620 that includes the memory controller 616 and one or more memory arrays 618, one or more input devices 622, one or more output devices 624, one or more network interface devices 626, and one or more display controllers 628, as examples. The input device(s) 622 can include any type of input device, including, but not limited to, input keys, switches, voice processors, etc. The output device(s) 624 can include any type of output device, including, but not limited to, audio, video, other visual indicators, etc. The network interface device(s) 626 can be any device configured to allow an exchange of data to and from a network 630. The network 630 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 626 can be configured to support any type of communications protocol desired.

The CPU(s) 608 may also be configured to access the display controller(s) 628 over the system bus 614 to control information sent to one or more displays 632. The display controller(s) 628 sends information to the display(s) 632 to be displayed via one or more video processors 634, which process the information to be displayed into a format suitable for the display(s) 632. The display(s) 632 can include any type of display, including, but not limited to, a cathode ray tube (CRT), a liquid crystal display (LCD), a plasma display, or a light-emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium wherein any such instructions are executed by a processor or other processing device, or combinations of both. As examples, the devices and components described herein may be employed in any circuit, hardware component, integrated circuit (IC), or IC chip. Memory disclosed herein may be any type and size of memory and may be configured to store any desired information. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware and may reside, for example, in Random Access Memory (RAM), flash memory, Read-Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. Alternatively, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications, as will be readily apparent to one of skill in the art. Those of skill in the art will also understand that information and signals may be represented using various technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

Implementation examples are described in the following numbered clauses:

1. A processor, comprising:
   - a first core circuit configured to execute instructions in an operating mode; and
   - a first core control circuit configured to control the first core circuit to:
     - transition from the operating mode to a clock-gated mode in which a clock signal to the first core circuit is blocked;
     - transition from the clock-gated mode to a power-collapse mode in which a supply voltage to the first core circuit is shut off; and
     - transition to the operating mode from the power-collapse mode.

2. The processor of clause 1, wherein the first core control circuit is configured to control the first core circuit to transition from the clock-gated mode to the power-collapse mode without first returning to the operating mode.

3. The processor of clause 1 or clause 2, wherein:
   - the first core circuit comprises transistor circuits which are configured to receive the clock signal and receive the supply voltage;
   - the clock signal is blocked from the transistor circuits in the clock-gated mode; and
   - the supply voltage to the transistor circuits is switched off in the power-collapse mode.

4. The processor of any of clause 1 to clause 3, the first core control circuit further configured to, in response to receiving an interrupt signal, control the first core circuit to transition from the clock-gated mode to the operating mode, comprising controlling the first core circuit to execute instructions for transitioning from the clock-gated mode to the operating mode.

5. The processor of any of clause 1 to clause 4, wherein the first core control circuit is configured to control the first core circuit to:

transition from the operating mode to the power-collapse mode; and transition from the power-collapse mode back to the operating mode in response to an interrupt signal, comprising controlling the first core circuit to execute instructions for transitioning from the power-collapse mode to the operating mode.

6. The processor of any of clause 1 to clause 5, the first core control circuit further comprising a timer circuit and further configured to control the first core circuit to transition from the clock-gated mode to the power-collapse mode in response to a timer signal from the timer circuit.

7. The processor of clause 6, wherein the first core control circuit is configured to, in response to an interrupt signal, control the first core circuit to transition from the power-collapse mode to the operating mode, comprising controlling the first core circuit to execute instructions for transitioning from the clock-gated mode to the operating mode.

8. The processor of clause 7, wherein to execute the instructions for transitioning from the clock-gated mode to the operating mode, the first core circuit is further configured to execute an instruction to reset the timer circuit.

9. The processor of any of clause 6 to clause 8, wherein to control the first core circuit to transition to the clock-gated mode, the first core control circuit is further configured to set a value in the timer circuit.

10. The processor of clause 9, wherein the value set in the timer circuit comprises a default value to cause the timer signal to be generated upon transitioning to the clock-gated mode.

11. The processor of any of clause 1 to clause 10, further comprising:

a plurality of core circuits other than the first core circuit; and a plurality of core control circuits other than the first core control circuit, wherein each of the plurality of core control circuits corresponds to one of the plurality of core circuits;

wherein each core control circuit of the plurality of core control circuits is configured to control the corresponding one of the plurality of core circuits to transition from the clock-gated mode to the power-collapse mode and transition to the operating mode from the power-collapse mode.

12. The processor of any of clause 1 to clause 11 integrated into a device selected from the group consisting of: a set-top box; an entertainment unit; a navigation device; a communications device; a fixed location data unit; a mobile location data unit; a global positioning system (GPS) device; a mobile phone; a cellular phone; a smartphone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; an avionics system; a drone; and a multicopter.

13. An integrated circuit (IC) comprising a processor, comprising:

a clock generation circuit configured to generate a clock signal;

a voltage control circuit configured to provide a supply voltage;

a plurality of core circuits, comprising a first core circuit configured to execute instructions in an operating mode; and a plurality of core control circuits comprising a first core control circuit configured to control the first core circuit to:

transition from the operating mode to a clock-gated mode in which the clock signal is blocked in the first core circuit;

transition from the clock-gated mode to a power-collapse mode in which the supply voltage is switched off in the first core circuit; and transition to the operating mode from the power-collapse mode.

14. A method in a processor to reduce power consumption, comprising:

controlling a first core circuit configured to execute instructions in an operating mode to:

transition from the operating mode to a clock-gated mode in which a clock signal is blocked in the first core circuit;

transition from the clock-gated mode to a power-collapse mode in which a supply voltage is switched off in the first core circuit; and transition to the operating mode from the power-collapse mode.

15. The method of clause 14, further comprising controlling the first core circuit to transition from the clock-gated mode to the power-collapse mode without first returning to the operating mode.

16. The method of clause 14 or clause 15, further comprising, in response to receiving an interrupt signal, controlling the first core circuit to transition from the clock-gated mode to the operating mode, comprising controlling the first core circuit to execute instructions for transitioning from the clock-gated mode to the operating mode.

17. The method of any of clause 14 to clause 16, further comprising controlling the first core circuit to:

transition from the operating mode to the power-collapse mode; and transition from the power-collapse mode back to the operating mode in response to an interrupt signal, comprising controlling the first core circuit to execute instructions for transitioning from the power-collapse mode to the operating mode.

18. The method of any of clause 14 to clause 17, further comprising controlling the first core circuit to transition from the clock-gated mode to the power-collapse mode in response to a timer signal from a timer circuit.

19. The method of clause 18, further comprising, in response to an interrupt signal, controlling the first core circuit to transition from the power-collapse mode to the operating mode, comprising controlling the first core circuit to execute instructions for transitioning from the clock-gated mode to the operating mode.

20. The method of clause 19, further comprising executing the instructions for transitioning from the clock-gated mode to the operating mode, comprising an instruction to reset the timer circuit.

21. The method of any of clause 18 to clause 20, wherein controlling the first core circuit to transition to the clock-gated mode further comprises controlling the first core control circuit to set a value in the timer circuit.

What is claimed is:

1. A processor, comprising:

a first core circuit configured to execute instructions in an operating mode; and a first core control circuit configured to control the first core circuit to:

based on a first predicted idle time:

transition from the operating mode to a clock-gated mode in which a clock signal to the first core circuit is blocked;

transition from the clock-gated mode to a power-collapse mode in which a supply voltage to the first core circuit is shut off; and transition to the operating mode from the power-collapse mode; and based on a second predicted idle time, transition from the operating mode to the power-collapse mode with a delay of zero cycles of the clock signal.

2. The processor of claim 1, wherein the first core control circuit is configured to control the first core circuit to transition from the clock-gated mode to the power-collapse mode without first returning to the operating mode.

3. The processor of claim 1, wherein:

the first core circuit comprises transistor circuits which are configured to receive the clock signal and receive the supply voltage;

the clock signal is blocked from the transistor circuits in the clock-gated mode; and the supply voltage to the transistor circuits is switched off in the power-collapse mode.

4. The processor of claim 1, the first core control circuit further configured to, in response to receiving an interrupt signal, control the first core circuit to transition from the clock-gated mode to the operating mode, comprising controlling the first core circuit to execute instructions for transitioning from the clock-gated mode to the operating mode.

5. The processor of claim 1, wherein the first core control circuit is configured to control the first core circuit to:

transition from the operating mode to the power-collapse mode; and transition from the power-collapse mode back to the operating mode in response to an interrupt signal, comprising controlling the first core circuit to execute instructions for transitioning from the power-collapse mode to the operating mode.

6. The processor of claim 1, the first core control circuit further comprising a timer circuit and further configured to control the first core circuit to transition from the clock-gated mode to the power-collapse mode in response to a timer signal from the timer circuit.

7. The processor of claim 6, wherein the first core control circuit is configured to, in response to an interrupt signal, control the first core circuit to transition from the power-collapse mode to the operating mode, comprising controlling the first core circuit to execute instructions for transitioning from the clock-gated mode to the operating mode.

8. The processor of claim 7, wherein to execute the instructions for transitioning from the clock-gated mode to the operating mode, the first core circuit is further configured to execute an instruction to reset the timer circuit.

9. The processor of claim 6, wherein to control the first core circuit to transition to the clock-gated mode, the first core control circuit is further configured to set a value in the timer circuit.

10. The processor of claim 9, wherein the value set in the timer circuit comprises a default value to cause the timer signal to be generated upon transitioning to the clock-gated mode.

11. The processor of claim 1, further comprising:

a plurality of core circuits other than the first core circuit; and a plurality of core control circuits other than the first core control circuit, wherein each of the plurality of core control circuits corresponds to one of the plurality of core circuits;

wherein each core control circuit of the plurality of core control circuits is configured to control the corresponding one of the plurality of core circuits to transition from the clock-gated mode to the power-collapse mode and transition to the operating mode from the power-collapse mode.

12. The processor of claim 1 integrated into a device selected from the group consisting of: a set-top box; an entertainment unit; a navigation device; a communications device; a fixed location data unit; a mobile location data unit; a global positioning system (GPS) device; a mobile phone; a cellular phone; a smartphone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; an avionics system; a drone; and a multicopter.

13. An integrated circuit (IC) comprising a processor, comprising:

a clock generation circuit configured to generate a clock signal;

a voltage control circuit configured to provide a supply voltage;

a plurality of core circuits, comprising a first core circuit configured to execute instructions in an operating mode; and a plurality of core control circuits comprising a first core control circuit configured to control the first core circuit to:

based on a first predicted idle time:

transition from the operating mode to a clock-gated mode in which the clock signal is blocked in the first core circuit;

transition from the clock-gated mode to a power-collapse mode in which a supply voltage is switched off in the first core circuit; and transition to the operating mode from the power-collapse mode; and based on a second predicted idle time, transition from the operating mode to the power-collapse mode with a delay of zero cycles of the clock signal.

14. A method in a processor to reduce power consumption, comprising:

controlling a first core circuit configured to execute instructions in an operating mode to:

based on a first predicted idle time:

transition from the operating mode to a clock-gated mode in which a clock signal is blocked in the first core circuit;

transition from the clock-gated mode to a power-collapse mode in which a supply voltage is switched off in the first core circuit; and transition to the operating mode from the power-collapse mode; and based on a second predicted idle time, transition from the operating mode to the power-collapse mode with a delay of zero cycles of the clock signal.

15. The method of claim 14, further comprising controlling the first core circuit to transition from the clock-gated mode to the power-collapse mode without first returning to the operating mode.

16. The method of claim 14, further comprising, in response to receiving an interrupt signal, controlling the first core circuit to transition from the clock-gated mode to the operating mode, comprising controlling the first core circuit to execute instructions for transitioning from the clock-gated mode to the operating mode.

17. The method of claim 14, further comprising controlling the first core circuit to:

transition from the operating mode to the power-collapse mode; and transition from the power-collapse mode back to the operating mode in response to an interrupt signal, comprising controlling the first core circuit to execute instructions for transitioning from the power-collapse mode to the operating mode.

18. The method of claim 14, further comprising controlling the first core circuit to transition from the clock-gated mode to the power-collapse mode in response to a timer signal from a timer circuit.

19. The method of claim 18, further comprising, in response to an interrupt signal, controlling the first core circuit to transition from the power-collapse mode to the operating mode, comprising controlling the first core circuit to execute instructions for transitioning from the clock-gated mode to the operating mode.

20. The method of claim 19, further comprising executing the instructions for transitioning from the clock-gated mode to the operating mode, comprising an instruction to reset the timer circuit.

21. The method of claim 18, wherein controlling the first core circuit to transition to the clock-gated mode further comprises controlling the first core control circuit to set a value in the timer circuit.

* * * * *